Dec. 12, 1967   G. E. SCHETTLER ET AL   3,357,580
BALE STACK LOADERS AND UNLOADERS
Filed Jan. 24, 1966   2 Sheets-Sheet 1
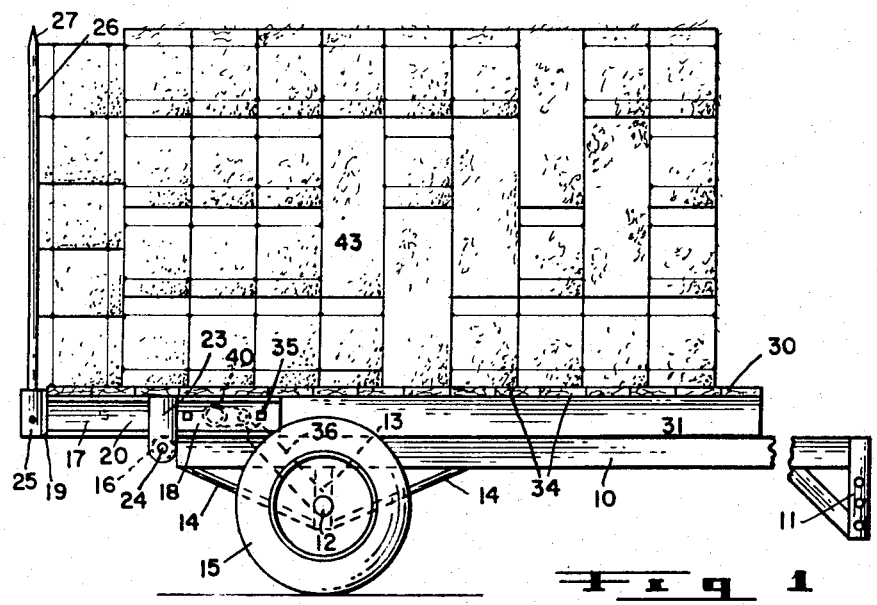
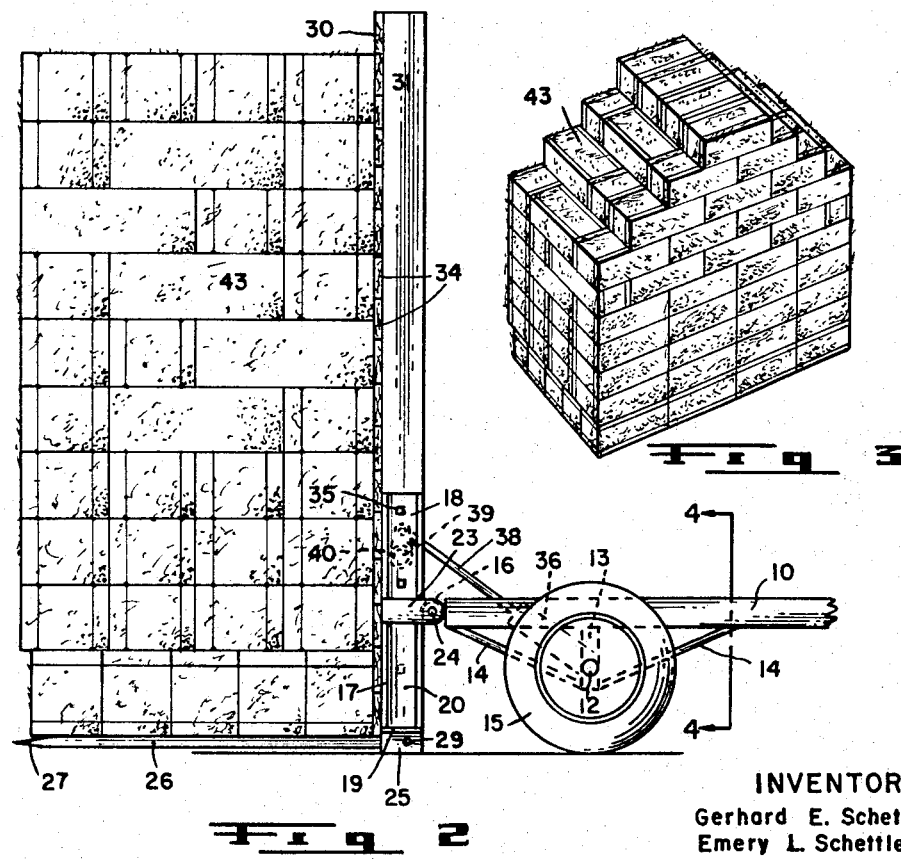
INVENTORS
Gerhard E. Schettler
Emery L. Schettler
Agent

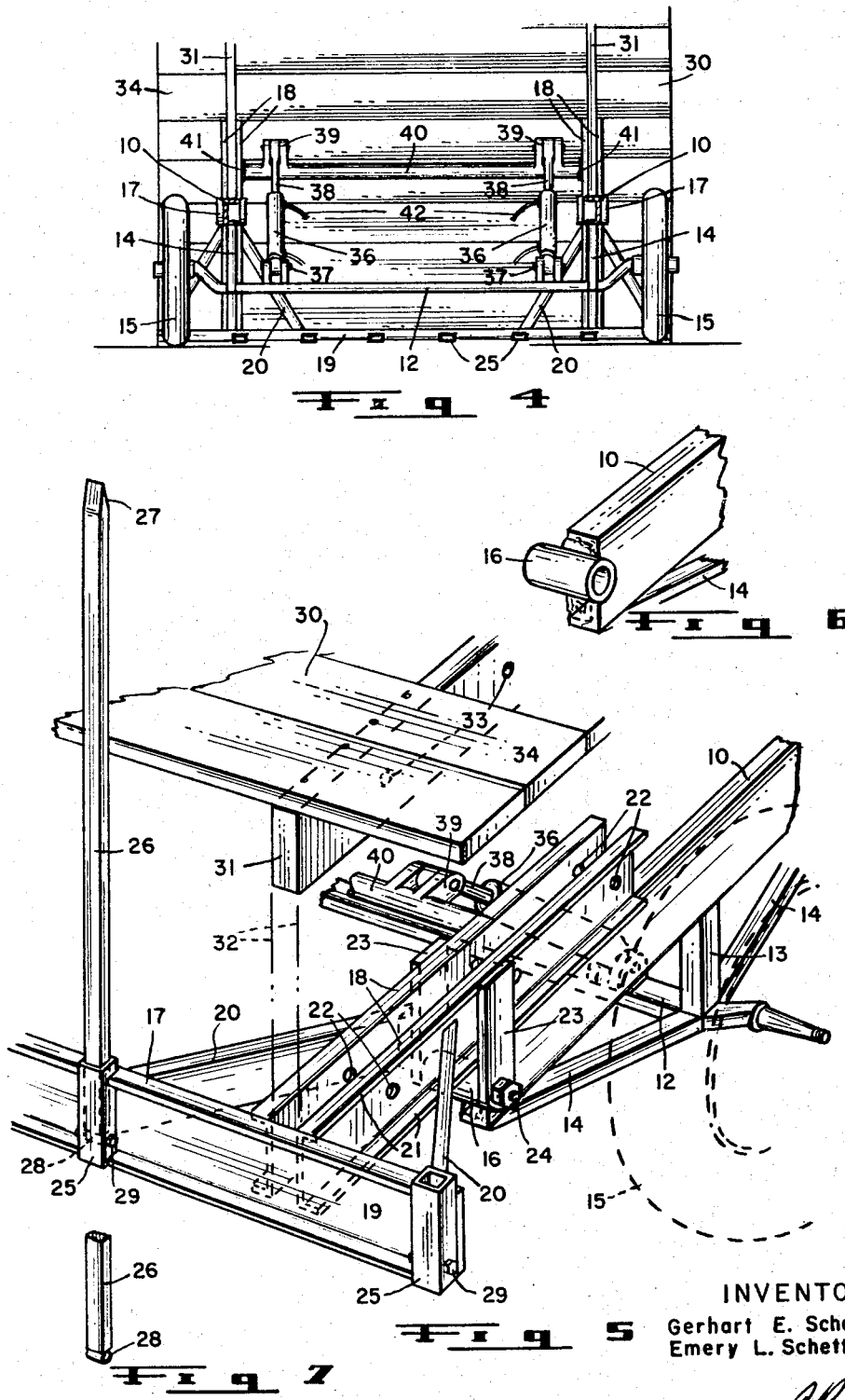

United States Patent Office 3,357,580
Patented Dec. 12, 1967

3,357,580
BALE STACK LOADERS AND UNLOADERS
Gerhard E. Schettler and Emery L. Schettler, both of McLean, Saskatchewan, Canada
Filed Jan. 24, 1966, Ser. No. 522,431
4 Claims. (Cl. 214—501)

It is a well known fact that the invention of the baler has revolutionized hay farming, in that the majority of grass crops grown on the farm are now baled, for ease of handling and compact storage.

As these balers deliver the bales in strewn disorder over the ground, it is necessary for the farmer to use a wheeled carrier, such as a wagon or truck, and employ hand labor to load the bales thereon for transportation to a designated location, where hand labor is again employed in arranging them in a large stack for protection, all of which is time consuming, and costly.

It is known to employ a special machine for mechanically picking up the bales and arranging them for stack dumping; but such machines are complicated, have to be guided to the bales, the bales themselves are so loosely arranged on the machine that they readily fall when stack dumped, and this machine cannot be used for other purposes. It is also very expensive.

It is also known to employ dump carts, which travel over the field for manual loading of bales thereon, while a second operator on the cart arranges them in a stack, for later mechanical dump. These field-dumped stacks have to be later picked up by another machine and removed to a location where they can be formed into larger stacks. This operation requires two workers, plus operations by two drivers.

The principal objects of the present invention are: to provide a relatively simple dump trailer, which can be drawn behind a tractor-pulled baler, for bale delivery thereto; with the dump mechanism of the trailer connected to the hydraulic system of the tractor for operation thereby; and such that the trailer bales can be hand-arranged and interlocked in a stack by an operator thereon, for later power dump onto the ground without spilling.

A further object of the invention is: to construct the trailer such that the tractor can be later directly connected thereto for re-lifting the dumped bales for said transportation to build a single stack elsewhere.

A further object of the invention is: to construct the trailer such that the loaded stack thereon will be centered over the support wheels, and such that the trailer can be manually released from the baler and connected to the hauling tractor, or vice-versa.

A still further object of the invention is: to construct the trail for quick release of the bale-carrying platform, or the dumping mechanism, for other replacements on the trailer chassis.

With the above important and other minor objects in view, which will become more apparent as this disclosure proceeds, the invention consists essentially in the construction and arrangement of the various parts hereinafter more particularly described, reference being had to the accompanying drawings, wherein:

FIGURE 1 is a side view of the trailer, stack-loaded with bales ready for deposit, the front hitch of the trailer being broken away.

FIGURE 2 is a similar view to FIGURE 1, but with the stack load dumped, ready to be pushed, or the stake runners pulled therefrom.

FIGURE 3 is a reduced perspective view of the dumped stack, without the trailer.

FIGURE 4 is a vertical sectional view taken on the line 4—4, of FIGURE 2.

FIGURE 5 is an enlarged perspective view of one of the rear corners of the trailer dump mechanism.

FIGURE 6 is a perspective view of one of the rear corners of the trailer chassis, and showing the pivot thereon.

FIGURE 7 is a perspective view of the bottom end of one of the stake runners.

In the drawings like characters of reference indicate corresponding parts in the several figures.

A trailer chassis 10 is provided with a front hitch 11. The rear end of the chassis is supported on a drop axle 12 by short vertical posts 13, one on each side, while angled front and rear brace bars 14 are welded between the axle and the bottom of the chassis side bars, for reinforcement. Each end of the axle is rotatably supported on ground wheels 15, and it will be appreciated that there is no resiliency between these ground wheels and the chassis of the trailer, other than pneumatic. The rear end of each chassis side member carries a short horizontal pivot tube 16, which is welded thereto (see FIGURE 6).

A U-shaped channel framework 17 is partially shown in FIGURE 5, and is pivotally supported on the cross tubes 16 of the chassis 10, as follows:

Each leg of the framework 17 presents a pair of spaced opposing channels 18, end-connected to the back of a rear cross channel 19, which extends therepast to form the base of the U. Suitable angular-positioned bracings 20 are provided for rigidity. The flanges 21 of the channels 18 project outward while the webs face, and suitable holes 22 are centrally drilled through these webs for a purpose later explained. A vertical link 23 is centrally welded across the flnages 21 of each channel, the bottom end of each link projecting therebelow, and provided with a drilled hole (not shown), so each side pair can straddle one of the pivots 16 for passage of a bolt 24 therethrough, thus providing the framework pivotal support mentioned.

The flanges of the rear cross channel 19 are notched at intervals therealong, for reception of a plurality of short vertical rectangular tubes 25, which are welded therein to provide sockets for the reception of the lower ends of similar-shaped stake runners 26. These runners extend upwardly the height of a bale load, and have knife-pointed upper ends 27, while their lower ends are welded to short cross tubes 28 (see FIGURE 7). These tubes are adapted to be aligned with holes (not shown) in the sides of the sockets 25, so pins or bolts 29 can pass through and securely anchor the runners to the cross channel 19.

A platform 30 is shown in FIGURE 5, above the framework 17, ready for connection therewith. This platform comprises a pair of spaced longitudinal beams 31, the rear ends of which are adapted to be received between the channels 18, as indicated by the dot and dash vertical lines 32. These beams are provided with holes 33 for registration with those 22 on the channels 18. A plurality of cross boards 34 are secured to the beams, such as by nails, to form the platform flooring. When this platform is dropped down, with the beams 31 between the channels 18, suitable bolts 35 pass through the aligned holes 22 and 33 to clamp the two together, and such that the platform will swing with the framework 17.

From the above disclosure it will be seen that the framework 17, and platform can turn on the pivots 24, as shown in FIGURE 2, and the rear channel 29 will swing down to the ground, with the stake runners 26 resting thereon. The complete framework, with platform, can also be reswung-up, back to the position shown in FIGURE 1.

A pair of hydraulic rams 36 (FIGURE 4) are pivotally mounted at 37 on the axle 12, inside the chassis side bars, and the pivots of these rams are aligned with the centers of the wheels 15. The upper ends of the ram shafts 38 are pivotally connected to brackets 39 on a cross tubing 40, which has each end welded to the inner channels 18, as shown at 41, so the rams form a connection between the front ends of the framework 17 and the axle 12. Suitable flexible tubings 42 connect the ends of the rams 36 with the hydraulic system of the tractor (not shown), so the operator thereof has complete pivot control of the framework and platform assembly.

In operation: The hitch 11 of the trailer is rear connected to the baler (not shown), so the bales therefrom will be delivered onto the platform 30, as the two are drawn over the field by a tractor (not shown). An operator on the platform will arrange the bales thereon in a side-lying stack, as shown at 43 in FIGURES 1, 2 and 3. In this work, the bales will be positioned in various directions as shown, and such that they interlock at strategic locations to take the strain of later dumping, without spilling. When the stack is completed, the operator on the tractor will direct the pressured hydraulic fluid to the tubings 41 of the trailer, and so cause the rams to operate, thus pivoting the framework assembly, as shown in FIGURE 2, and dumping the stack. While the bales are in this vertical stack dump, the tractor will pull the baler, and accordingly, the trailer runners 26 from under the stack. As each stack comprises one hundred and forty bales approximately, this constitutes a clearance of several acres, and a level spot to dump the stack can usually be found in that large an area. It will also be noticed, in FIGURE 1, that the side-formed stack has its center of gravity pretty well positioned over the ground wheels 15, so the hitch 11 can be easily raised or lowered manually.

When the field is baled and stacked as described, the trailer is manually disconnected from the bailer, and directly connected to the tractor, for simplicity operation. This hook-up is then used to pick-up the widely-separated stacks on the field and transport them to a location for assembly into a single large stack, for improved weatherproof storage. In so doing, the empty trailer is aligned with a stack, dumped, and then backed against the stack by the tractor, the stake runners 16 passing thereunder, as shown in FIGURE 2. As the runners are centrally knife-pointed, they do not dig into the stack or the ground. When completely under the stack, the hydraulic system on the tractor is operater, and the stack lifts back onto the trailer, as shown in FIGURE 1, for transport. In this manner, all field stacks are carried to the location mentioned, dumped as described, and then pushed back by the tractor against the standing ones in a tight fit, and so form a single large stack.

It will be particularly noted that the lower ends of the stake runners are anchored to the channel 19, so they can be either pulled or pushed by the tractor, to pull-out from or pass under the stacks. It will also be seen that the channel 19 is above the pivot points 24 in FIGURE 1. Accordingly, when the framework assembly swings down, the channel 19 does not strike the ground, but nicely clears it, and the stake runners land smoothly on the ground with their stack of bales, without bumping or causing any spill. At the same time, these stake runners will easily slide along the ground, when the trailer is pulled or pushed, cannot dig into the ground, and therefore no reinforcement is needed on the back of the trailer to hold the platform vertically rigid, when the stack is being dumped, or pressed against a standing one.

The tractor drawn trailer can now be used for other hauling work, if desired, and by withdrawing the bolts 24 and disconnecting the rams from the axle, both the platform 30 and the framework 17 can be removed as a unit, or they can be separated by removing the bolts 35, for installation of a different carrying rack on the chassis or the framework. In other words; this invention gives the farmer a general utility trailer as well as an economical and reasonable priced bale stacker, which very efficiently dumps, transports, and re-loads the stacks.

What we claim as our invention is:

1. A bale stack loader and unloader, comprising: a wheel and axle supported chassis having a pivot at each of the rear corners thereof; a U-shaped framework normally resting on said chassis, with the base of the U extending thereover, and each leg of the U forked to span and hinge on one of said pivots; a series of elongated stake runners having one end of each releasably secured in spaced relation to and along the framework base, with their free ends pointed and projecting upwardly at right angles therefrom; a fluid-operable ram interposed between the axle of the chassis and the forward part of the framework, for swinging said framework on the pivots to a horizontal deposit of the runners on the ground, and for return of the framework, with the runners, to the original resting position on the chassis; a platform carried by the framework for receiving bales thereon; said bales adapted to be supported on the runners, during said framework movement; and means for connecting said ram with a source of fluid power.

2. A bale stack loader and unloader, as described in claim 1, wherein longitudinal support beams are secured to and support the platform, and are received within and releasably fastened to the forked legs of the U-shaped framework.

3. A bale stack loader and unloader, as described in claim 1, wherein said chassis is rigidly supported from a drop axle, and the ram pivot thereon is aligned with the centerline of the wheels.

4. A bale stack loader and unloader, as described in claim 1, wherein the stake runners are centrally knife-pointed at one end, and their opposite ends carry an integral cross tube, for pin connection to the framework.

References Cited

UNITED STATES PATENTS 2,726,115  12/1955  Babcock et al. _____ 214—501 X
3,013,682  12/1961  Unruh _____ 214—501

HUGO O. SCHULZ, *Primary Examiner.*

A. J. MAKAY, *Assistant Examiner.*